United States Patent
Buckmeier et al.

(10) Patent No.: US 9,588,564 B2
(45) Date of Patent: Mar. 7, 2017

(54) POWER OVER ETHERNET FOR 10GBASE-T ETHERNET

(71) Applicant: Bel Fuse (Macao Commercial Offshore) Ltd., Andar H-J Macau (MO)

(72) Inventors: Brian Buckmeier, San Diego, CA (US); Edwin Edralin, San Diego, CA (US); John Matthew Hess, Timonium, MD (US)

( * ) Notice: Subject to any disclaimer, the term of this patent is extended or adjusted under 35 U.S.C. 154(b) by 7 days.

(21) Appl. No.: 14/831,102

(22) Filed: Aug. 20, 2015

(65) Prior Publication Data

US 2016/0187951 A1     Jun. 30, 2016

Related U.S. Application Data

(60) Provisional application No. 62/039,603, filed on Aug. 20, 2014.

(51) Int. Cl.
  *G06F 1/26*     (2006.01)
  *H01R 13/66*    (2006.01)
  *H01R 24/64*    (2011.01)

(52) U.S. Cl.
  CPC ......... *G06F 1/266* (2013.01); *H01R 13/6633* (2013.01); *H01R 24/64* (2013.01); *H01R 2201/04* (2013.01)

(58) Field of Classification Search
  None
  See application file for complete search history.

(56) References Cited

U.S. PATENT DOCUMENTS

| | | | | |
|---|---|---|---|---|
| 5,736,916 A | * | 4/1998 | Vlahu | H01F 19/08 336/69 |
| 8,082,453 B2 | * | 12/2011 | Diab | G06F 1/266 307/29 |
| 2008/0297393 A1 | * | 12/2008 | Sollner | H03M 1/44 341/172 |
| 2014/0129853 A1 | * | 5/2014 | Diab | H04L 12/413 713/310 |
| 2014/0293994 A1 | * | 10/2014 | Pepe | G02B 6/4284 370/352 |

* cited by examiner

*Primary Examiner* — Nitin Patel
(74) *Attorney, Agent, or Firm* — Patterson Intellectual Property Law, PC; Mark J. Patterson; Gary L. Montle

(57) ABSTRACT

A power over Ethernet (PoE) interface for 10GBase-T Ethernet includes at least one communication channel Ethernet interface including an autotransformer having a center tap for coupling direct current (DC) power. A combination of the geometry of the toroid core of the autotransformer and in some embodiments of a common mode choke, as well as the wire twisting, the wire distribution and the wire routing allow maximizing bandwidth up to or greater than 500 MHz for 10GBase-T performance by increasing the coupling and reducing capacitance across the wires, and results in return and insertion losses and OCL that meet anticipated standards.

31 Claims, 15 Drawing Sheets

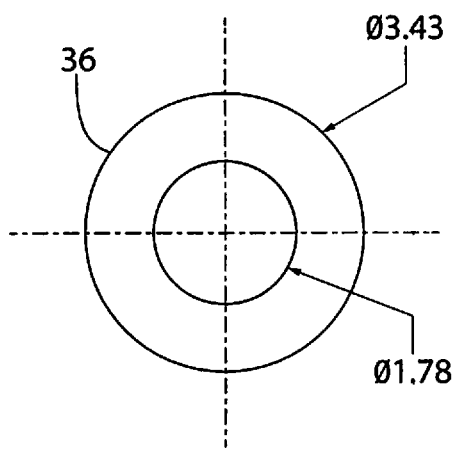
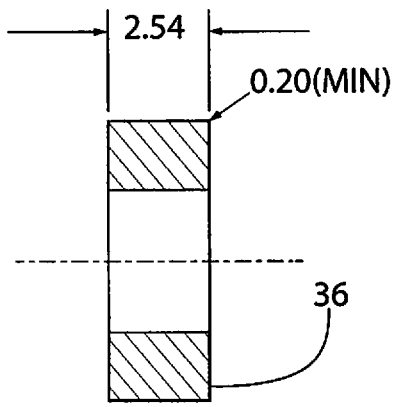
FIG. 5A  FIG. 5B
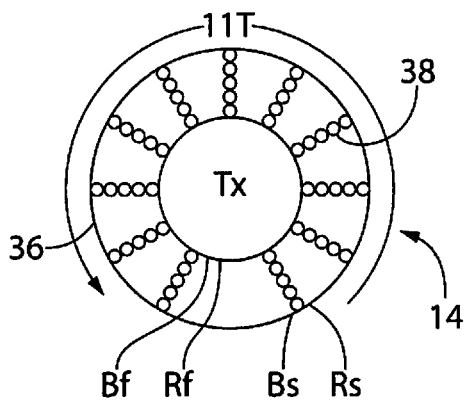
FIG. 6
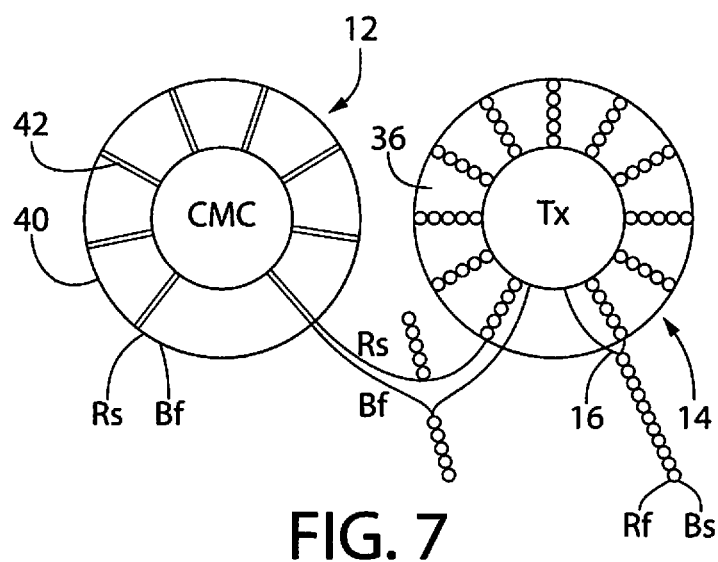
FIG. 7

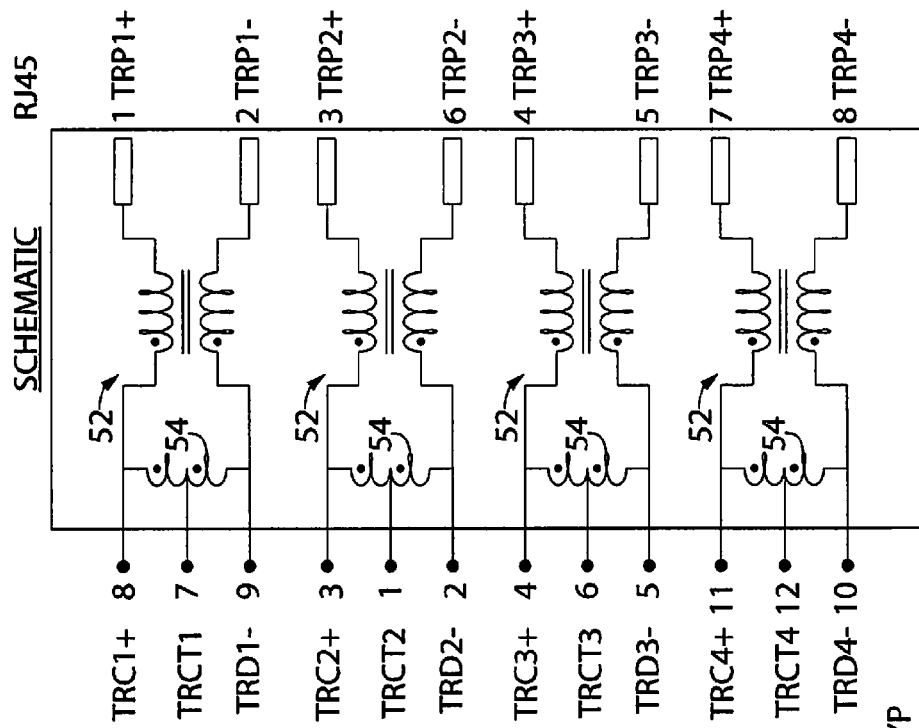

FIG. 12

ELECTRICAL CHARACTERISTICS @ 25°C
INDUCTANCE @ 100kHz/100mVRMS
(8-9) = (2-3) = (4-5) = (10-11) 500µH MIN.
INS. LOSS
  100 KHz             -0.7 dB MAX
  1 MHz - 500MHz      -3 dB MAX
RET. LOSS
  1 MHz - 125 MHz     -30 dB MIN
  300 MHz - 500 MHz   -15 dB MIN
CROSS TALK
  1 MHz - 100 MHz     -43 dB MIN
  100 MHz - 500 MHz   -33 dB MIN
CM TO CM REJ
  1 MHz - 100 MHz     -40 dB MIN
  100 MHz - 300 MHz   -35 dB MIN
  300 MHz - 500 MHz   -30 dB MIN
CM TO DM REJ
  1 MHz - 250 MHz     -33 dB MIN
  250MHz - 500 MHz    -25 dB MIN
CM TO DM REJ
  1 MHz - 250 MHz     -33 dB MIN
  250MHz - 500 MHz    -25 dB MIN

LED1 AND LED2
VF (FORWARD VOLTAGE)     IF = 20mA    GREEN  2.2V TYP
                                      YELLOW 2.1V TYP
λD (DOMINANT WAVELENGTH) IF = 20mA    GREEN  570mm TYP
                                      YELLOW 590mm TYP

DESIGNED TO SUPPORT 57V, 100W APPLICATION WHEN PHANTOM
POWERING ALL 4 CHANNELS

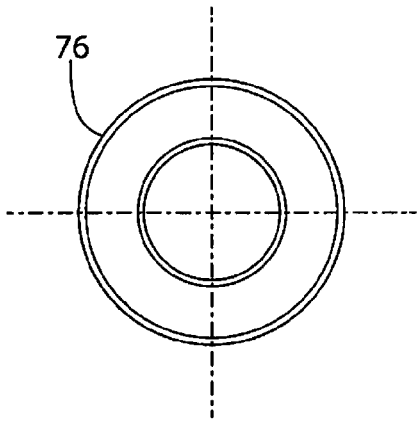
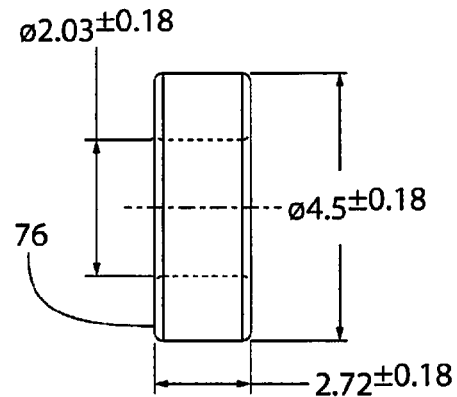
FIG. 16A  FIG. 16B
Tx WINDING
1. R ON TX WIND 8T OVER 160° ARC, TAKE Rf RETURN CONTINUE WIND 4T EVENLY DISTRIBUTE
2. N ON TX WIND 8T OVER 160° ARC, TAKE Ns RETURN CONTINUE WIND 4T EVENLY DISTRIBUTE
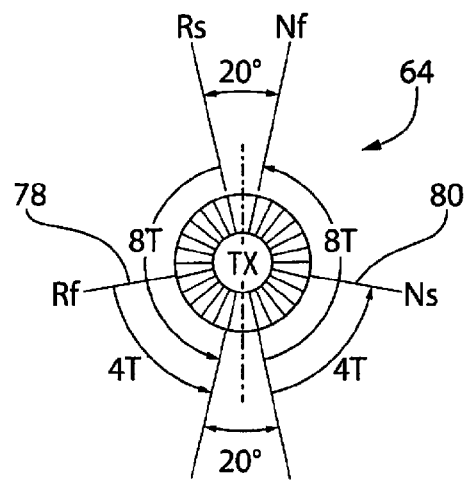
FIG. 17

POWER OVER ETHERNET FOR 10GBASE-T ETHERNET

CROSS REFERENCE TO RELATED APPLICATIONS

These application claims the benefit of priority to and incorporates herein by reference in its entirety for all purposes, U.S. provisional patent Application No. 62/039,603 filed Aug. 20, 2014 entitled Winding Methodology for 10 GBT Power Insertion.

TECHNICAL FIELD OF THE INVENTION

This invention relates generally to power over Ethernet and, more particularly, to the insertion of power in 10GBase-T, as well as 10Base-T, 100Base-T and 1000Base-T, Ethernet networks.

BACKGROUND OF THE INVENTION 10 gigabit (10GBase-T) Ethernet is the most recent generation of Ethernet network after 10Base-T, 100Base-T and 1 gigabit (1GBase-T) Ethernet. 10GBase-T allows data to be transferred at speeds of 10,000 Mbps or 10 Gbps. 10GBase-T is designed to run over CAT 5 or CAT 5E twisted pair cable which is widely available. CAT 5 cables have four twisted wire pairs of which only two are used for 10Base-T or 100Base-T. In order to achieve higher transmission speeds, 1GBase-T and 10GBase-T Ethernet networks use all four pairs of twisted wire to transmit data.

Power over Ethernet (PoE) is a system in which, in addition to data, electrical power is passed over Ethernet cabling. This enables the elimination of a separate cable solely for power use in favor of a single cable (e.g., via a CAT 5/5E cable) to provide both a data connection and electrical power to devices such as wireless access points, resulting in substantial savings in installation costs. The need for AC power and DC transformers at the powered device location is eliminated.

There are two different ways of feeding power to Ethernet networks, namely spare-pair power and phantom power. In phantom power feed the voltage is coupled to the wire pairs that carry the data signals. Since twisted-pair Ethernet uses differential signaling, the power can be supplied on the same wire pair that carries data. In spare-pair power feed, the voltage is coupled to the unused or spare wire pairs, i.e., the wire pairs that do not carry data. Spare-pair power feed does not apply to 1GBase-T or 10GBase-T Ethernet networks because all eight wire pairs are used for signal transmission, i.e., no spare-pairs are available. Thus, phantom power feed is used in 1 gigabit and 10 gigabit PoE networks. Power is transmitted on the data conductors by applying a common-mode voltage to each pair, either from an endspan power supply within a PoE-enabled networking device (PSE), such as an Ethernet switch, or with a midspan power supply. Endspans are essentially Ethernet switches with PoE circuits added and are typically used in new installations. Midspans are not integrated into the switch but are positioned between it and the powered device (PD). They are usually used when a PD, such as an IP phone or wireless AP, is added to an existing non-PoE network.

Power over Ethernet standards are defined under IEEE 802.3af (2003) and IEEE 802.3at (2009). The original IEEE 802.3af standard specifies a supply of 48 VC and up to 350 mA so that the power source element does not exceed 15.4 watts. After power dissipation in the cable, the power actually delivered to the PD is limited to 12.95 W.

Increasing power delivered to the PD is the main objective of subsequently developed PoE standards. IEEE 802.3at (also known as PoE+, 2009) provides up to 30 W of 50-V DC power at the PSE. After cable loss, 25.5 W is delivered to the PD. IEEE 802.3at added 1GBase-T which uses all four pairs for data transmission. 10GBase-T PoE is not specified in either 1EEE 802.3af or 802.3at.

The relatively small amount of power that can be delivered to PDs under the 802.3at standard (25.5 W), has limited the application of PoE much beyond wireless APs and IP phones. However, the anticipated introduction of a new PoE standard, IEEE 802.3bt, will at least double the power delivered to the PD by allowing power over all four pairs in a standard Ethernet cable. The new standard is also expected to standardize PoE with 10GBase-T Ethernet. The ability to deliver higher power to PDs will expand the applicability of PoE to high-volume applications such as building management applications (many around 50 W), point-of-sale systems (30 to 60 W), and industrial motor control systems (>30 W).

Problems arise in connection with supplying greater amounts of power to 10GBase-T Ethernet networks. Power is typically inserted using center-tapped transformers or autotransformers connected between two pins of each wire pair. The transformers typically include a magnetic core comprising a toroid core with a magnetic winding. As data speeds and power increase in PoE systems, higher magnetizing and DC current bias capabilities are required for the toroidal magnetic cores. Transformer core saturation can limit the current that can be sent to a PD. Transmission characteristics are now specific to bandwidths of 500 MHz. Loading of conventional toroidal transformers or autotransformers on the signal path up to 500 MHz with higher power can corrupt the data signal and result in return and insertion losses, open circuit inductance (OCL) and DC current imbalance that fail to meet the standards specified in clause 33 of the IEEE 802.3 standard which defines the characteristics of PD and PSE equipment.

SUMMARY OF THE INVENTION

An object of the present invention is to provide new and improved magnetic circuit designs that provide DC power interfaces for 10GBase-T over UTP (unshielded twisted pair) and/or STP (shielded twisted pair) copper cable as specified by IEEE 802.3af, IEEE 802.3an, IEEE 802.3at, IEEE 802.bt and IEEE 802.3bu.

Another object of the present invention is to provide compatibility with existing 10Base-T, 100Base-T and 1000Base-T as well as 10GBase-T, i.e., such magnetic circuit designs that are 4-speed capable.

Another object of the present invention is to provide such magnetic circuit designs that provide RL (return loss) of −12 dB at a bandwidth of up to 500 MHz at cable resistance tolerances of 85, 100 and 115 ohms as specified in IEEE 802.3.

Another object of the present invention is to provide such magnetic circuit designs that meet OCL (open circuit inductance) standards with 19 mA of DC bias current at 100 KHz and 100 m Vrms over the operating temperature range specified in IEEE 802.3.

Another object of the present invention is to provide such magnetic circuit designs that are capable of handling more than 700 mA of current over the operating temperature range specified in IEEE 802.3.

Another object of the present invention is to provide such new and improved magnetic circuit designs capable of higher magnetizing forces and DC current bias.

Another object of the present invention is to provide such new and improved magnetic circuit designs that provides a nonstandard 500 μH inductance from 0 to 70° C.

Yet another object of the invention is to provide connectors and discrete components incorporating such new and improved magnetic circuit designs.

Briefly, these and other objects are attained by providing power over Ethernet (PoE) interfaces including in one embodiment autotransformers and common mode chokes and in another embodiment including only autotransformers, in which the geometry and material of toroidal cores, wire twisting, wire distribution and wire routing are fine-tuned to maximize bandwidth up to or greater than 500 MHz for 10GBase-T performance by increasing the coupling and reducing capacitance across the wires resulting in return and insertion losses that meet system specifications including OCL with 500 μH, with 19 mA DC bias @ 100 KHz, 100 m Vrms.

In one embodiment, the interface includes at least one channel adapted to process differential signals from twisted pair cables, each channel including a common mode choke (CMC) and a center-topped autotransformer coupled to the common mode choke. A common mode choke is included in the embodiment to suppress radiated emissions. The autotransformer includes a toroid core and a magnetic winding having specially designed features comprising a pair of wires in the range of between about 35 gauge and 37 gauge, preferably about 36 gauge, twisted together (about 12 twists per inch) and wound around the core in the range of between about 8 to 14 turns, preferably about 11 turns. The CMC also includes a toroid core and a magnetic winding comprising a pair of wires that are not twisted and which are wound around the core in the range of between about 6 to 12 turns, preferably about 9 turns. The wires extend from the common mode choke to data and power input pins of the interface in untwisted form. The combination of the constructional features of the autotransformer and common mode choke provide a four channel interface that channels as described above meets the standards specified for 10GBase-T power over Ethernet and can support 60 W applications. A second embodiment of an interface having the same construction as described above in which the pair of twisted wires wound around the toroid core of the autotransformer are in the range of between about 31 gauge to 33 gauge, preferably 32 gauge wire. This embodiment can support 100 W applications.

In a third embodiment, the interface includes at least one channel adapted to process differential signals from twisted pair cables, each channel including an autotransformer, the interface being without a common mode choke. The torodial core of the autotransformer is formed of a soft MnZn ferrite material and a magnetic winding of the autotransformer comprises two untwisted wires, each wire wound around a respective sector of the core in the range of between about 5 to 11 turns, preferably about 8 turns, in one direction and then back in the other direction in the range of between about 2 to 6 turns, preferably about 4 turns, the wires in the respective sections not touching each other, and extending to data and power input pins of the interface without being twisted together. An interface having four channels as described above also meets the standards specified for 10GBase-T power over Ethernet and can support 60 W applications. A fourth embodiment that supports 30 W applications includes the same circuit as the third embodiment with power injected only on two channels.

According to the invention, power insertion into the interfaces can be accomplished by either endpoint PSE or mid-span insertion modules and the interfaces can be incorporated in surface mount packages and modular jack connectors.

DESCRIPTION OF THE DRAWINGS

A more complete appreciation of the present invention and many of the attendant advantages thereof will be readily understood by reference to the preferred embodiments illustrated in the accompanying drawings in which:

FIGS. 5A and 5B are a front view and a side view in section respectively of a toroid core of an autotransformer constituting a component of the circuit shown in FIG. 1, according to the first embodiment of the invention;

FIG. 6 is a schematic view of a wound toroid core of an autotransformer constituting a component of the circuit shown in FIG. 1, according to the first embodiment of the invention;

FIG. 7 is a schematic view of a wound toroid core of an autotransformer connected to a wound toroid core of a common mode choke constituting components of the circuit shown in FIG. 1, according to the first embodiment of the invention;

FIG. 12 shows a topology for a four channel circuit for providing a PoE data and power interface for 10GBase-T transmission rate (4 speed capable) incorporating a circuit similar to that shown in FIG. 1 for 100 W applications, including electrical specifications thereof, according to a second embodiment of the invention;

FIGS. 16A and 16B are a front view and a side view respectively of a toroid core of an autotransformer constituting a component of the circuit shown in FIG. 14, according to the third embodiment of the invention;

FIG. 17 is a schematic view of a wound toroid core of an autotransformer constituting a component of the circuit shown in FIG. 14, according to the third embodiment of the invention;

DETAILED DESCRIPTION OF THE PREFERRED EMBODIMENTS

Figure 1:
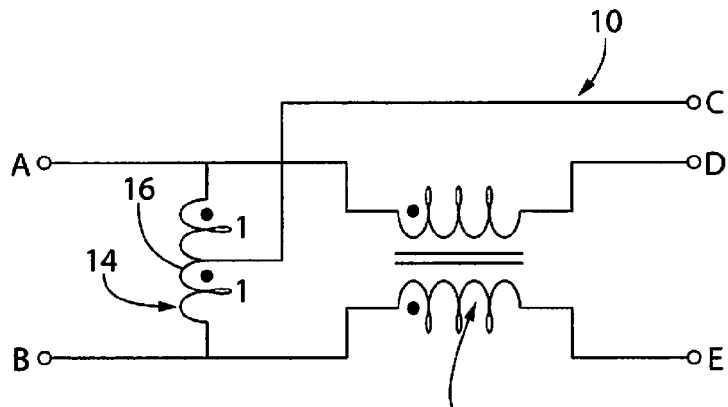
FIG. 1 shows a topology of a circuit for providing a PoE data and DC power interface for 10GBase-T transmission rate (4 speed capable) according to a first embodiment of the invention.

Referring now to the drawings wherein like reference characters designate identical or corresponding items or parts throughout the several views, FIG. 1 shows a topology of a single channel interface circuit 10 for providing a PoE data and DC power interface for Ethernet 10GBase-T transmission (as well as 10Base-T, 100Base-T and 1GBase-T, i.e., which is four speed capable) embodying components according to the first embodiment of the invention. The interface 10 is adapted to process a differential signal from a twisted pair cable. The single channel interface 10 comprises a common mode choke (CMC) 12 and an autotransformer 14 coupled to the common mode choke 12. Data-in terminals A and B are coupled to data-out terminals D and E. The autotransformer 14 is equipped with a center-tap 16 for coupling direct current (DC) power through terminal C so that interface 10 constitutes a PoE interface. While the overall interface 10 shown in FIG. 1 is in general conventional, the novel combination of the geometry and material of the toroidal cores of the autotransformer and CMC, as well as the wire twisting, the wire distribution and the wire routing of the autotransformer and CMC, described in detail below, allow maximizing bandwidth up to or greater than 500 MHz for 10GBase-T performance by increasing the coupling and reducing capacitance across the wires, and result in return and insertion losses and OCL that meet system specifications.

Figure 2:
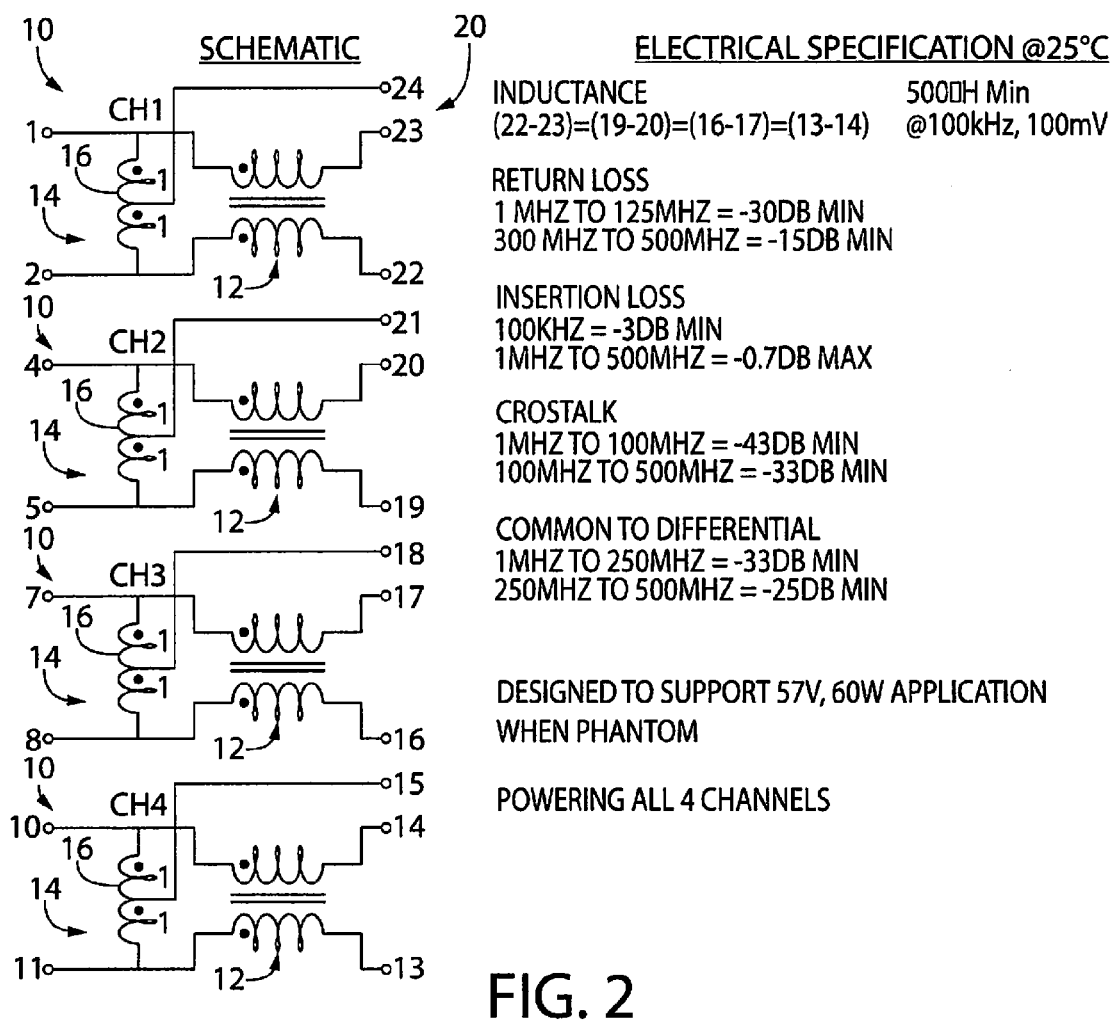
FIG. 2 shows a topology for a four channel circuit for providing a PoE data and power interface for 10GBase-T transmission rate (4 speed capable) incorporating the circuit shown in FIG. 1 for 60 W applications including electrical specifications thereof, according to the first embodiment of the invention.

FIG. 2 shows a topology for a four channel interface circuit 20 for providing a PoE data and power interface for 10GBase-T transmission incorporating four of the circuits 10 of FIG. 1 according to the first embodiment. The electrical specifications of the four channel interface are shown.

Figure 3:
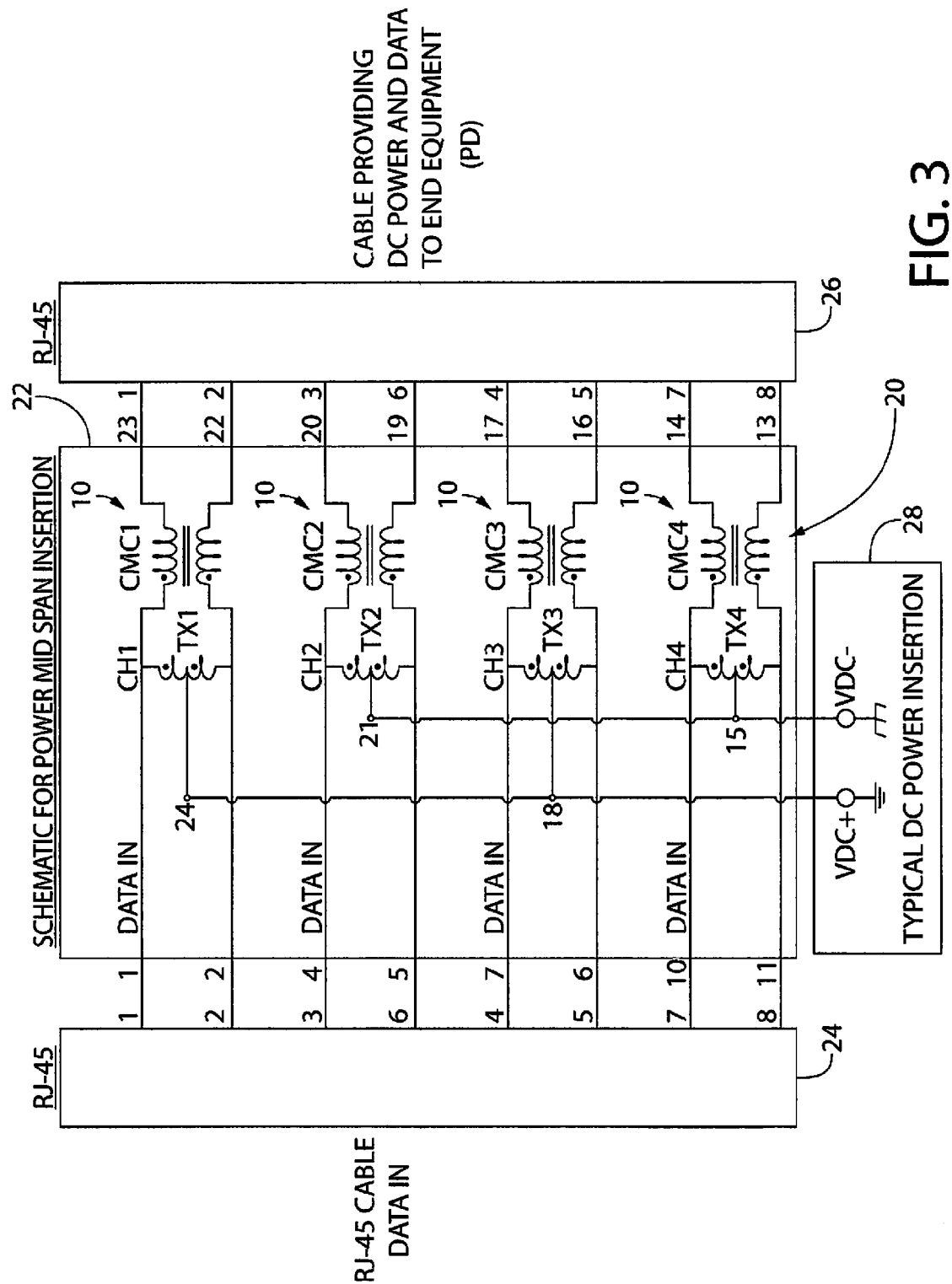
FIG. 3 is a schematic application drawing showing a discrete component incorporating the circuit topology shown in FIG. 2 coupled to and providing a data and DC power interface between a data-in-cable and connector and a DC power and data-to-end equipment cable and connector, with mid-span power insertion, according to the first embodiment of the invention.

FIG. 3 is a schematic application drawing showing a discrete component 22 incorporating the four channel circuit interface 20 of FIG. 2, coupled to and providing a data and DC power interface between a data-in-cable through an RJ-45 connector 24 on one side and a cable providing DC power and data-to-end equipment (PD) through an RJ-45 connector 26. A mid-span power insertion module 28 injects DC power onto each of the four channels 10 through the center taps 16 of the respective autotransformers 14. The terminal pin designations of the connectors and interface 20 are shown.

Figure 4:
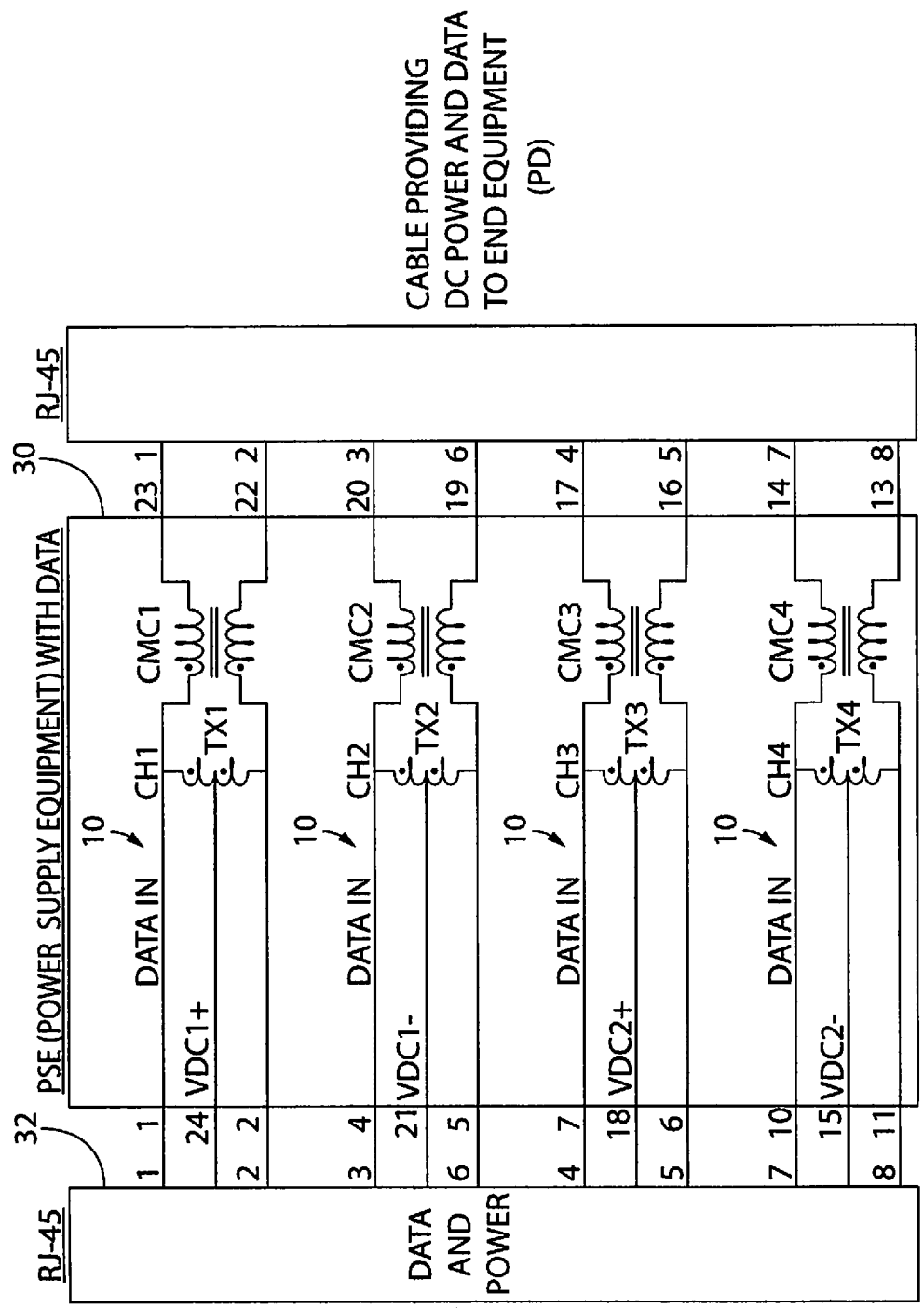
FIG. 4 is a schematic application drawing showing a discrete component incorporating the circuit topology shown in FIG. 2 coupled to and providing a data and DC power interface between power and data supply equipment and DC power and data-to-end equipment cable and connector, i.e., with end span power insertion (PSE) according to the first embodiment of the invention.

Similarly, FIG. 4 is a schematic application drawing showing a discrete component 30 incorporating the four channel circuit interface 20 of FIG. 2, coupled to and providing a data and DC power interface between data and power equipment (PSE) 32 on one side and a cable providing DC power and data to end equipment (PD) through an RJ45 connector 34. The PSE 32 constitutes an endspan insertion device that injects DC power onto each of the four channels 10 through the center taps 16 of the respective autotransformers 14. The terminal pin designations of the connector and interface 20 are shown.

Referring to FIGS. 5A and 5B, according to the first embodiment, autotransformers 14 each comprise a toroidal core 36 formed of a high DC bias material blend of soft MnZn and ferrite to help achieve higher DC bias (19 mA). The core has an outer diameter of 3.43 mm, an inner diameter of 1.78 mm and a height of 2.54 mm. These dimensions can vary plus or minus about 15% in accordance with the invention. The use of this core alone is insufficient to achieve the necessary coupling and reduction in inter-wire capacitance required to achieve the electrical specifications. The core was chosen to achieve higher (19 mA) DC bias within the constraints of the packaging. However, as discussed below, the core 36 when used in conjunction with the particular CMC construction and wire twisting and routing, will neutralize the parasitic capacitance sufficient to meet the specifications shown in FIG. 2

Conventional core designs for 1GBase-T transmission speeds are only required to meet 8 mA DC bias and will not allow for larger wire gauges and current handling required. They only meet OCL of about 350 µH minimum at 100 KHz, with 100 mV and 8 mA of DC bias.

While the particular core dimensions and material were chosen in order to enable winding enough wire around the core to obtain an OCL of 500 µH @ 100 KHz, with 100 mV and 19 mA of DC bias from 0 to 70° C., this was not fully achieved since packaging constraints prevented enlarging the core. However, it was found that by using the impedance or inductance (positive phase) of the CMC in combination with the wire configurations described below, the desired results were obtained.

Referring to FIGS. 2 and 6, there is a capacitance (interwinding capacitance) between the data output pins of each channel, i.e., between pins 22 and 23, pins 19 and 20, pins 16 and 17 and pins 13 and 14. It was found that if the core 36 is wound using two untwisted wires as is conventional with 1 G applications, meeting the electrical specifications shown in FIG. 2 was not possible. However, by winding the core 36 with two 36 gauge wires 38 twisted together at 12 twists per inch (tpi) for 11 turns, the capacitive loading or parasitic winding capacitance and wire to core capacitance is significantly reduced up to frequencies over 500 MHz, thereby enabling the core 36 to be used in the given packaging space. The gauge of wires 38 can be in the range of between about 35 and 37 gauge within the scope of the invention.

The number of wire turns on the autotransformer and CMC cores can vary plus or minus 3 turns in this embodiment and in the embodiments described below within the scope of the invention.

Referring to FIG. 7, the CMC 12 comprises a toroidal core 40 with a low permeability to allow for a high self-resonant frequency (SRF) for inductance at higher frequency. The CMC 12 has two functions. One function is a common mode noise suppressor to reduce system noise. The other is to neutralize the parasitic capacitance over frequency of the autotransformers. In particular, in addition to twisting the wire 38 of the autotransformer 14, the inductance of the CMC 12 helps neutralize any remaining capacitance of the core due to its bifilar winding. It was found that providing the CMC 12 with a winding 42 having 9 turns provided maximum impedance/inductance up to 500 MHz to meet the specifications shown in FIG. 2.

Wire gauge is used to meet current carrying requirements of 720 mA DC continuous and 1.2 A maximum for 200 µs. However, using larger wire increases the capacitive loading that needs to be neutralized for performance up to 500 MHz.

Figure 8:
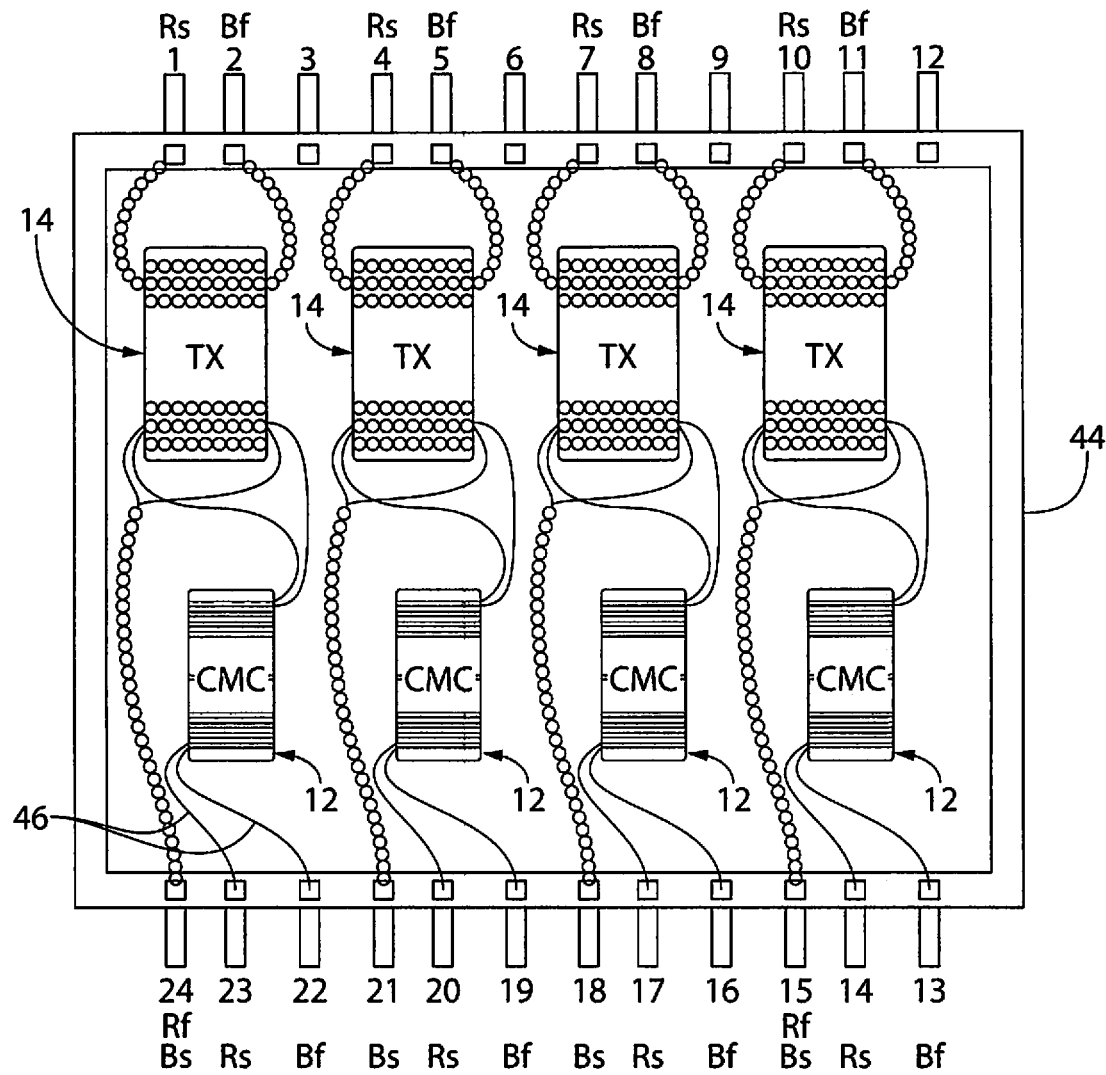
FIG. 8 is a schematic plan view of a discrete component, such as a surface mount package, incorporating the four channel circuit shown in FIG. 2 and illustrating the arrangement of the autotransformers and common chokes and the distribution of wires to terminal pins according to the first embodiment of the invention.

Referring to FIG. 8, illustrating the arrangement of autotransformers 14 and common mode chokes 12 and the distribution and routing of wires to terminal pins of a discrete component 44, such as a surface mount package, incorporating the four channel circuit interface 20 shown in FIG. 2, in order to keep the shunt resistance down, the two wire portions 46 extending between the CMCs 12 and data output terminal pins 22, 23 are untwisted. The same is true for the other channels. This is to be compared to 1 G applications where the differential pairs are generally twisted to the terminal pins to reduce radiated emissions which is possible since they do not have to meet requirements above 125 MHz.

Figure 9:
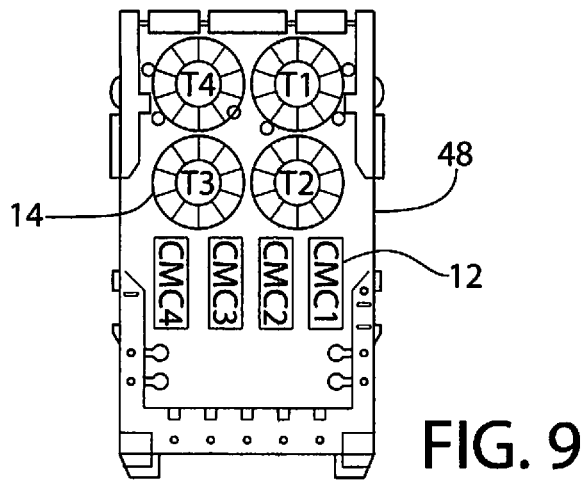
FIG. 9 is a schematic plan view of a modular jack incorporating the four channel circuit shown in FIG. 2 and illustrating the arrangement of the autotransformers and common mode chokes according to the first embodiment of the invention.

FIG. 9 shows a modular jack 48 incorporating the four channel circuit 20 shown in FIG. 2 and illustrating the arrangement of the autotransformers 14 and common mode chokes 12.

Figure 10A:
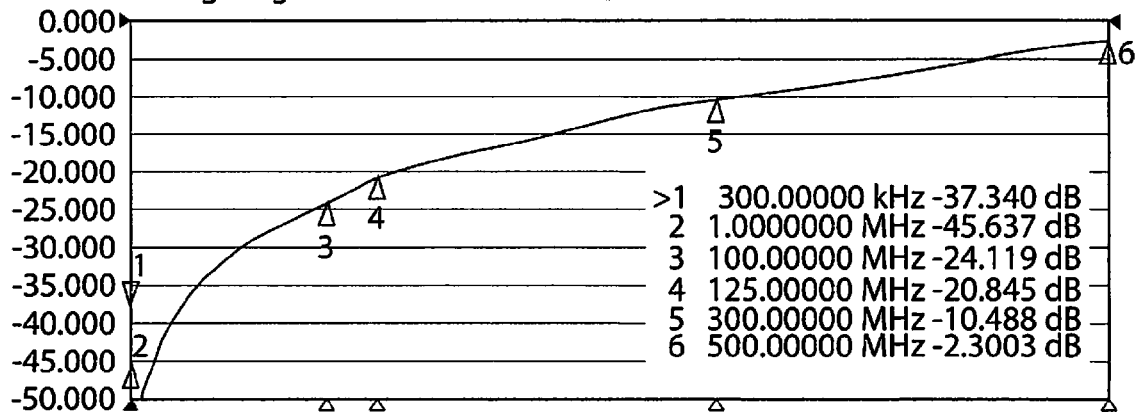
FIG. 10A is plot of return loss versus frequency for standard interfaces for 1 G performance.
Figure 11A:
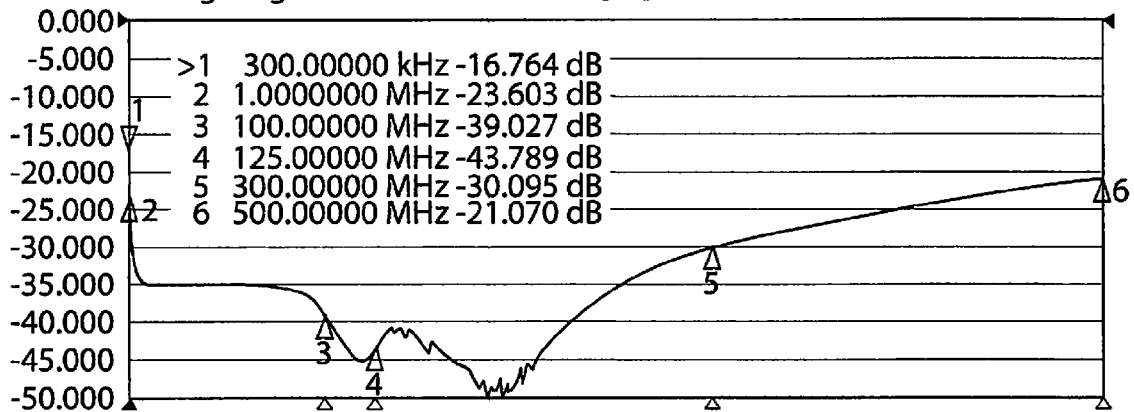
FIG. 11A is a plot of return loss versus frequency for 10 G performance of a channel of the four channel circuit shown in FIG. 2 according to the first embodiment of the invention.

FIG. 10A is a plot of return loss versus frequency for standard 1 G performance and listing values for six key frequencies. This is compared to FIG. 11A which is a similar plot of return loss versus frequency for 10 G performance of a channel according to the first embodiment of the invention. It is noted that at frequencies over 100 MHz, return loss for the invention at 10 G is better (more negative) than the return loss for standard 1 G performance.

Figure 10B:
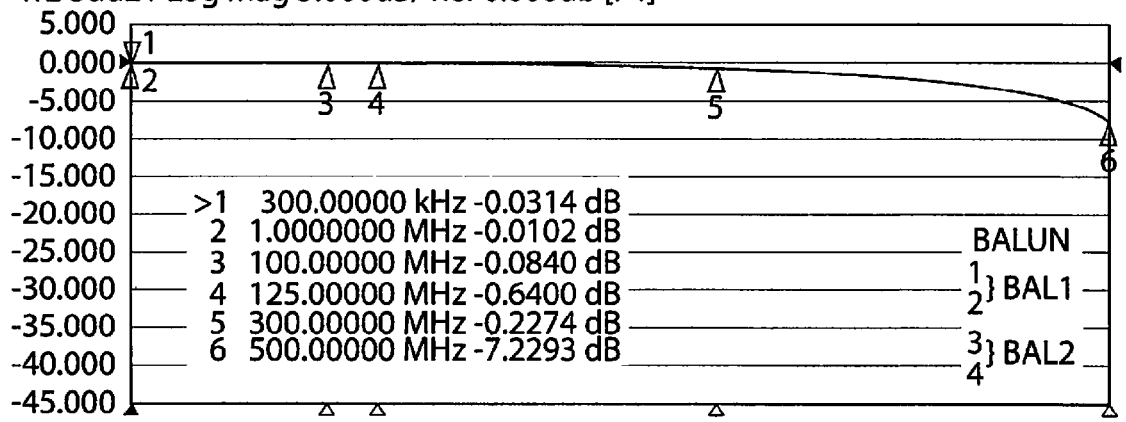
FIG. 10B is a plot of insertion loss versus frequency for standard interfaces for 1 G performance.
Figure 11B:
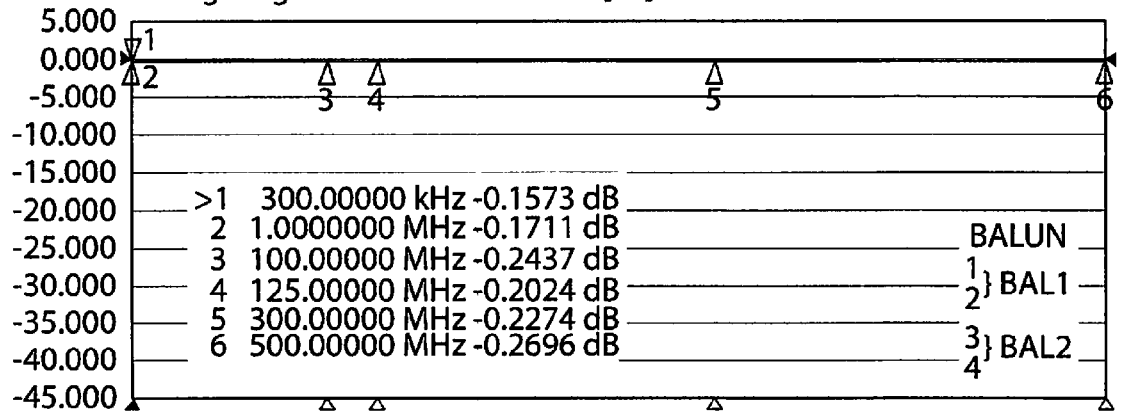
FIG. 11B is a plot of insertion loss versus frequency for 10 G performance of a channel of the four channel circuit shown in FIG. 2 according to the first embodiment of the invention.

FIG. 10B is a plot of insertion loss versus frequency for standard 1 G performance and listing values for six key frequencies. This is compared to FIG. 11B which is a similar plot of insertion loss versus frequency for 10 G performance of a channel according to the first embodiment of the invention. It is noted that at frequencies 300 MHz and over, insertion loss for the invention at 10 G is better (less negative).

Referring to FIG. 12, a topology is shown for a four channel circuit for providing a PoE data and DC power interface 50 for 10GBase-T transmission rate (4 speed capable) incorporating four single channel circuits 52 for 100 Watt applications, including electrical specifications thereof, according to a second embodiment of the invention. Each of the single channel circuits 52 include a CMC 12 identical to the CMC 12 of the first embodiment, and an autotransformer 54 which has a core and winding configuration and wire distribution and routing the same as described above with respect to the first embodiment, except that 32 gauge wire is used in lieu of 36 gauge wire. This enables the interface to support 100 Watt applications. The wire can be in the range of between about 31 to 33 gauge according to the invention.

Figure 13:
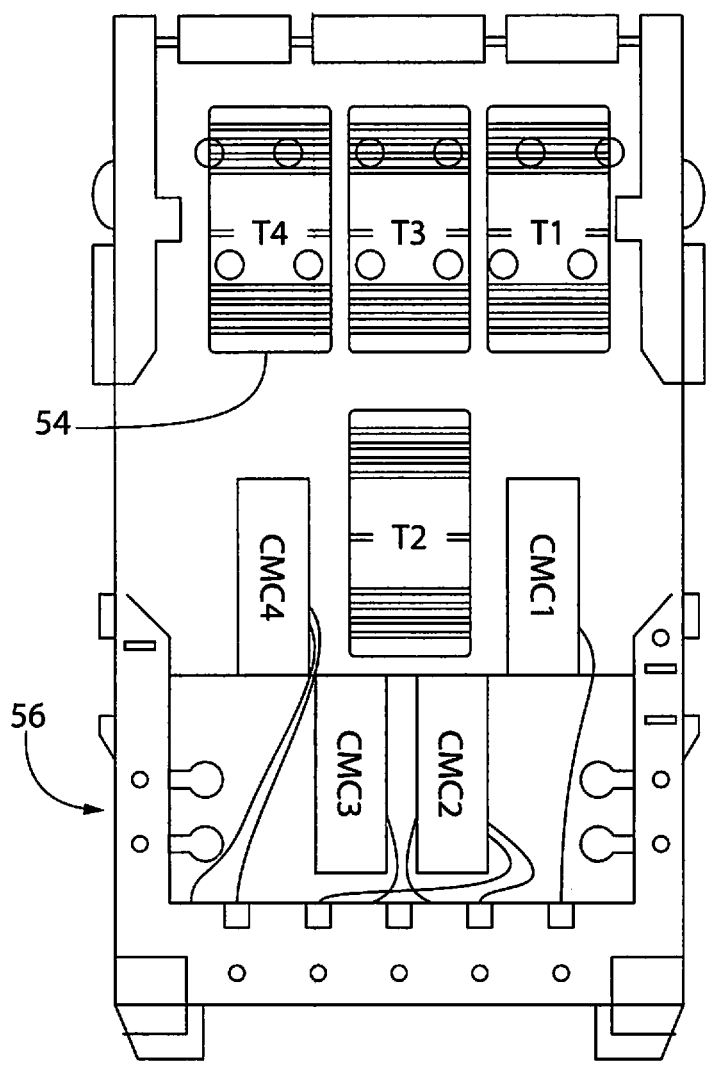
FIG. 13 is a schematic plan view of a modular jack incorporating the four channel circuit shown in FIG. 12 and illustrating the arrangement of the autotransformers and common mode chokes, according to the second embodiment of the invention.

A modular jack 56 incorporating the four channel circuit interface 50 shown in FIG. 12 is illustrated in FIG. 13 and illustrates the arrangement of the autotransformers 54 and CMCs 12.

Figure 14:
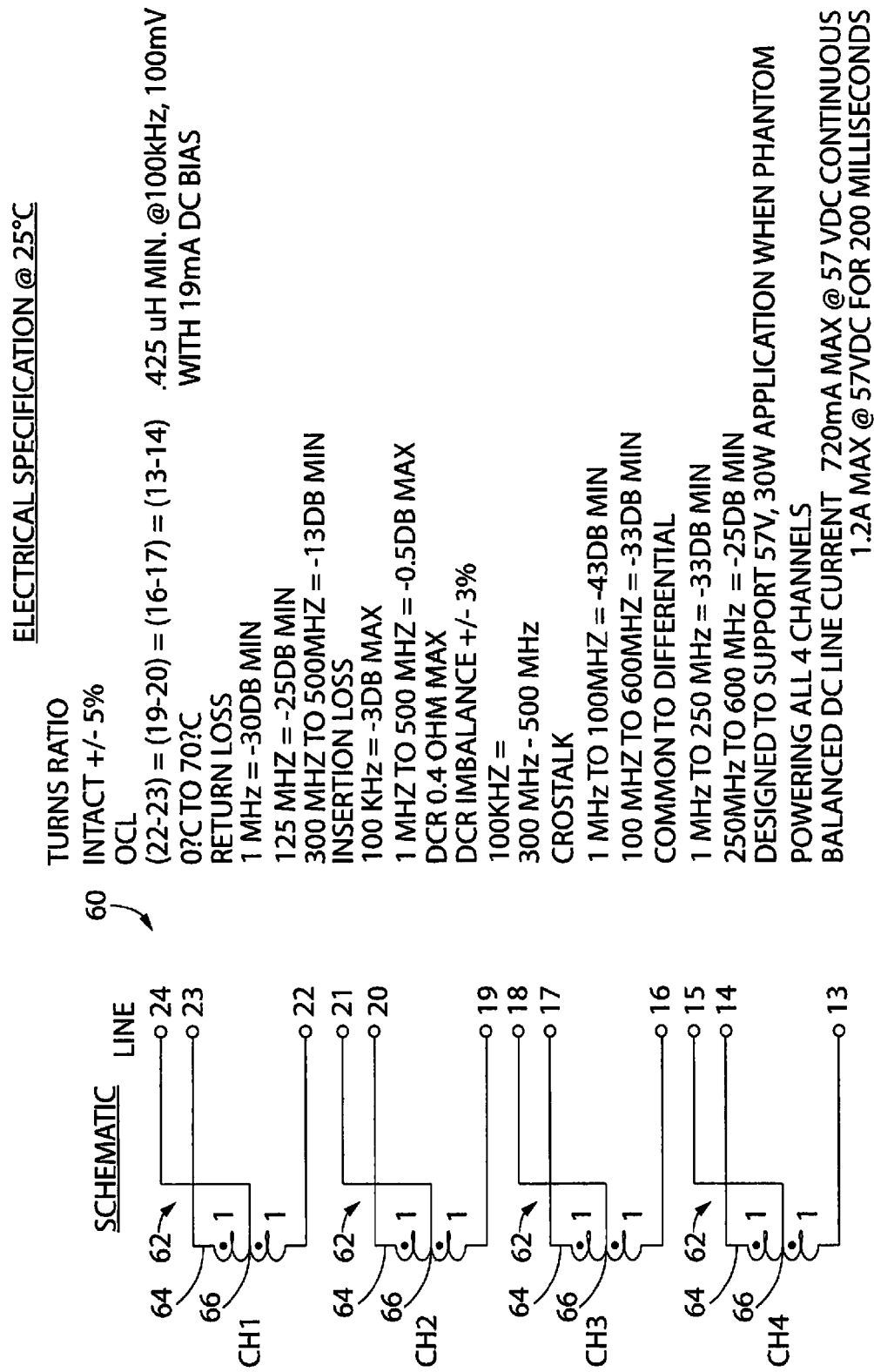
FIG. 14 shows a topology for a four channel circuit for providing a PoE data and power interface for 10GBase-T transmission rate incorporating a circuit without a common mode choke for 60 W applications, including electrical specifications thereof according to a third embodiment of the invention.

FIG. 14 shows the topology of a four channel circuit for providing a PoE data and DC power interface 60 for Ethernet 10GBase-T (four speed capable) embodying components according to a third embodiment of the invention. The interface 60 is adapted to process differential signals from twisted pair cable. The interface 60 comprises four single channel circuits 62, each circuit 62 comprising an autotransformer 64. The autotransformers each are equipped with a center tap 66 for coupling DC power into the circuit. As described in detail below, while the overall interface 60 shown in FIG. 14 is in general conventional, the novel combination of the geometry and material of the toroidal cores of the autotransformers, as well as the wire twisting, the wire distribution and the wire routing of the autotransformers allow maximizing bandwidth up to or greater than 500 MHz for 10GBase-T performance by increasing the coupling and reducing capacitance across the wires, and result in return and insertion losses and OCL that meet system specifications.

Figure 15:
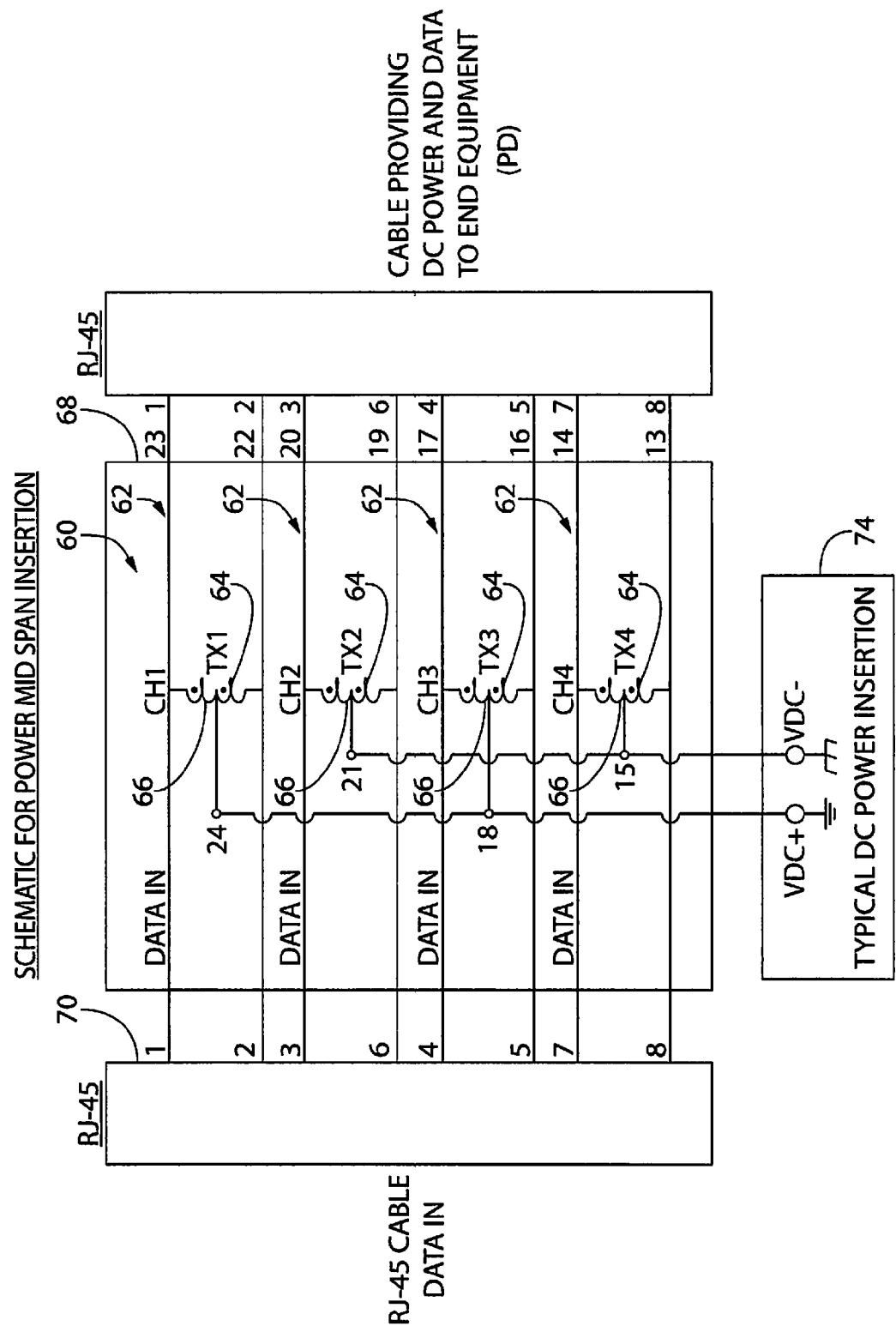
FIG. 15 is a schematic application drawing showing a discrete component incorporating the circuit topology of FIG. 14 coupled to and providing a data and power interface between a data-in-cable and connector and a DC power and data-to-end equipment cable and connector, with mid-span power insertion, according to the third embodiment of the invention.

FIG. 15 is a schematic application drawing showing a discrete component 68 incorporating the four channel circuit interface 60 of FIG. 14, coupled to and providing a data and DC power interface between a data-in-cable through an RJ45 connector 70 on one side and a cable providing DC power and data to end equipment (PD) through an RJ 45 connector 72 on the other side. A mid-span power insertion module 74 injects DC power onto each of the four channels 62 through center taps 66 of the respective autotransformers 64. The terminal pin designators of the connectors and interface 60 are shown. An endspan power insertion arrangement i.e., a PSE (not shown), is also possible.

Referring to FIGS. 16A and 16B, according to the third embodiment, autotransformers 64 each comprise a toroidal core 76 formed of a high DC bias material blend of soft ferrite and MnZn. The material of the core helps achieve higher (19 mA) DC bias requirements within packaging size constraints. Conventional 1 G designs are only required to meet 8 mA DC bias so that the conventional cores can be smaller.

Each core 76 has an outer diameter of 4.5 mm, an inner diameter of 2.03 mm and a height of 2.72 mm. These dimensions can vary plus or minus about 15% in accordance with the invention. The use of a core having the foregoing properties is insufficient by itself to achieve the necessary coupling and reduction in inter-wire capacitance required to achieve the electrical specifications, although the dimensions fit the required standard packaging. Specifically, while the particular core dimensions and material were chosen in order to enable winding enough wire around the core in a single layer to meet the required OCL of 425 μH minimum @ 100 KHz, with 100 mV and 19 mA of DC bias from 0° to 70° C., this was not fully achieved and packaging constraints prevented enlarging the core. However, it was found that if the core 76 was wound in a certain manner, the required specifications would be achieved.

In particular, referring to FIG. 17, the wires 78, 80 are 34 gauge wires wound on core 76 in two sections separated by 20° gaps at their ends. Each wire is wound 8 turns evenly in one direction over a respective 160° section and then back wound in the other direction 4 turns. The wires in the respective sections do not touch each other. This is different than conventional 1 G applications which only need to meet an OCL of about 350 μH minimum @ 100 KHz, with 100 mV and 8 mA of DC bias from 0° C. to 70° C. Conventional windings for 1 G applications have the two wires touching each other and wound together. The gauge of the wires 78, 80 can be in the range of between about 32 to 36 gauge within the scope of the invention.

Figure 18:
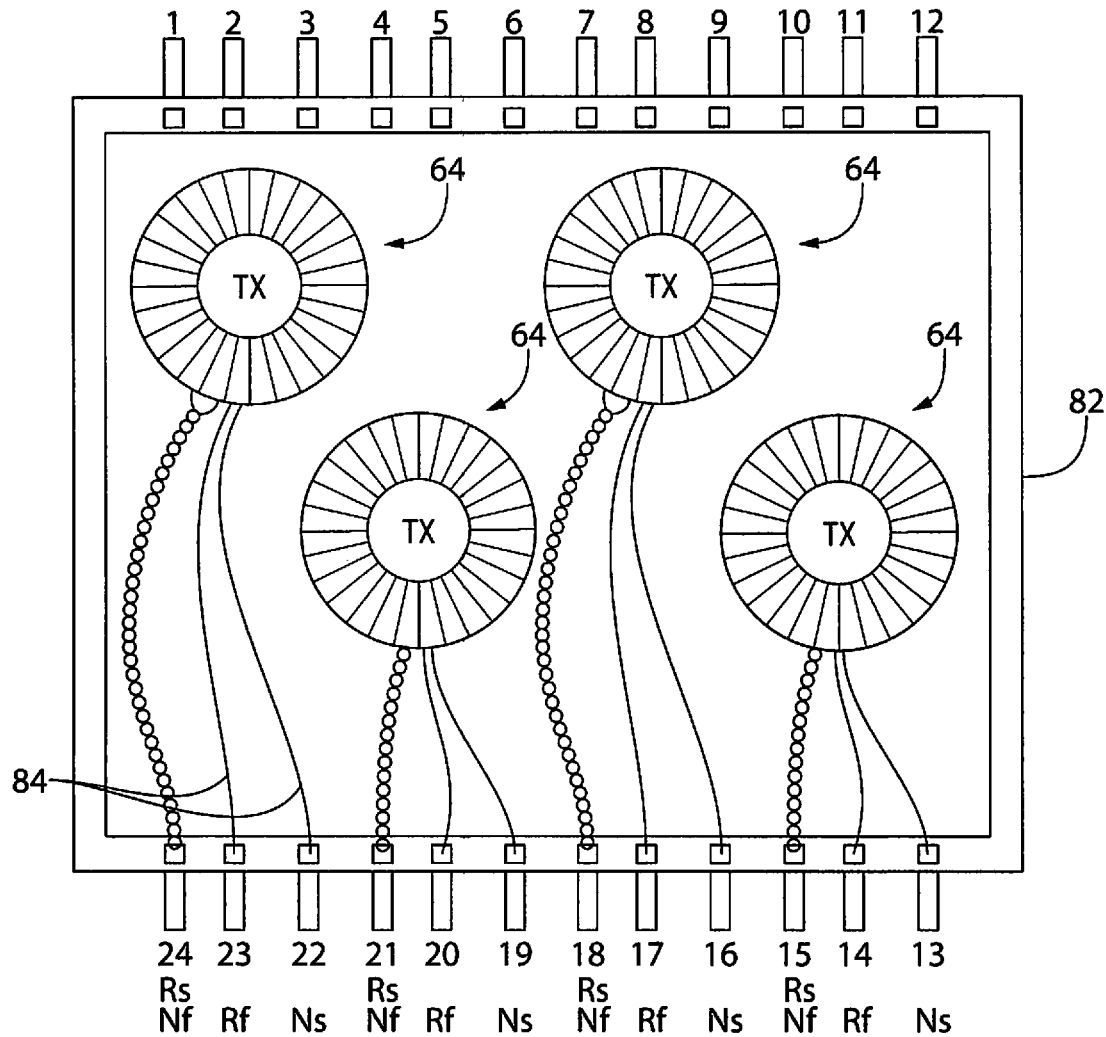
FIG. 18 is a schematic plan view of a discrete component, such as a surface mount package, incorporating the four channel circuit shown in FIG. 14 and illustrating the arrangement of the autotransformers and the distribution of wires to terminal pins, according to the third embodiment of the invention.

Referring to FIGS. 14 and 18, there is a capacitance (inter-winding capacitance) between the data output pins of each channel, i.e., between pins 22 and 23, pins 19 and 20, pins 16 and 17 and pins 13 and 14. It was found that if core 76 is wound using two wires together as is conventional with 1 G applications, meeting the specifications shown in FIG. 2 was not possible. However, by winding the core 76 in two sections leaving gaps between the windings, the capacitive loading or parasitic winding capacitance is significantly reduced up to frequencies over 500 MHz thereby enabling the core 76 to be used in the given packaging space.

Wire gauge is used to meet current carrying requirements of 720 mA DC continuous and 1.2 A maximum for 200 μS. Using larger wire increases the capacitive loading that needs to be neutralized for performance up to 500 MHz.

Referring to FIG. 18 illustrating the arrangement of autotransformers 64 and the distribution and routing of wires to terminal pins of a discrete component 82, such as a surface mount package, incorporating the four channel interface 60 shown in FIG. 14, in order to keep the shunt resistance down, the two wire portions 84 extending between the autotransformers and the data output terminal pins 22, 23 are not twisted. The same is true for the other channels. In 1 G applications the differential pairs are generally twisted to the pin terminal connection to reduce radiated emissions since they do not have to meet requirements above 125 MHz.

Figure 19A:
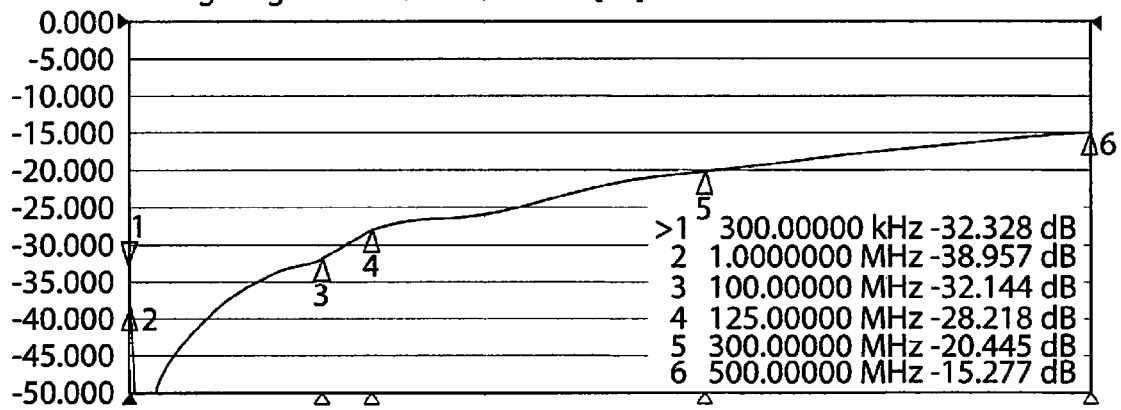
FIG. 19A is a plot of return loss versus frequency for 10 G performance of a channel of the four channel circuit shown in FIG. 14 according to the third embodiment of the invention.

FIG. 19A is a plot of return loss versus frequency for 10 G performance of a channel according to the third embodiment of the invention. It is noted that return loss for the invention at 10 G is better (more negative) than the return loss for standard 1 G performance (see FIG. 10A) at frequencies over 100 MHz.

Figure 19B:
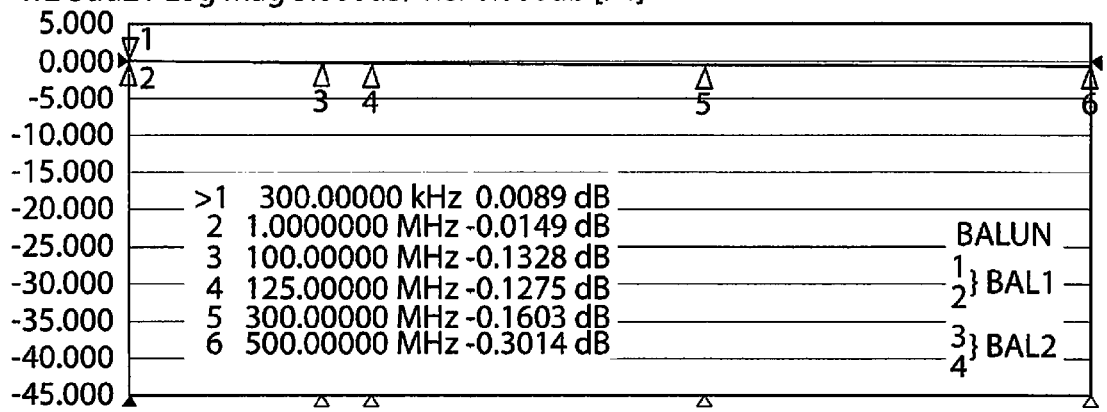
FIG. 19B is a plot of insertion loss versus frequency for 10 G performance of a channel of the four channel circuit shown in FIG. 14 according to the third embodiment of the invention.

FIG. 19B is a plot of insertion loss versus frequency for 10 G performance of a channel according to the third embodiment of the invention. It is noted that insertion loss for the invention at 10 G is better (less negative) than the insertion loss for standard 1 G performance (see FIG. 10B) at frequencies 300 MHz and over.

Figure 20:
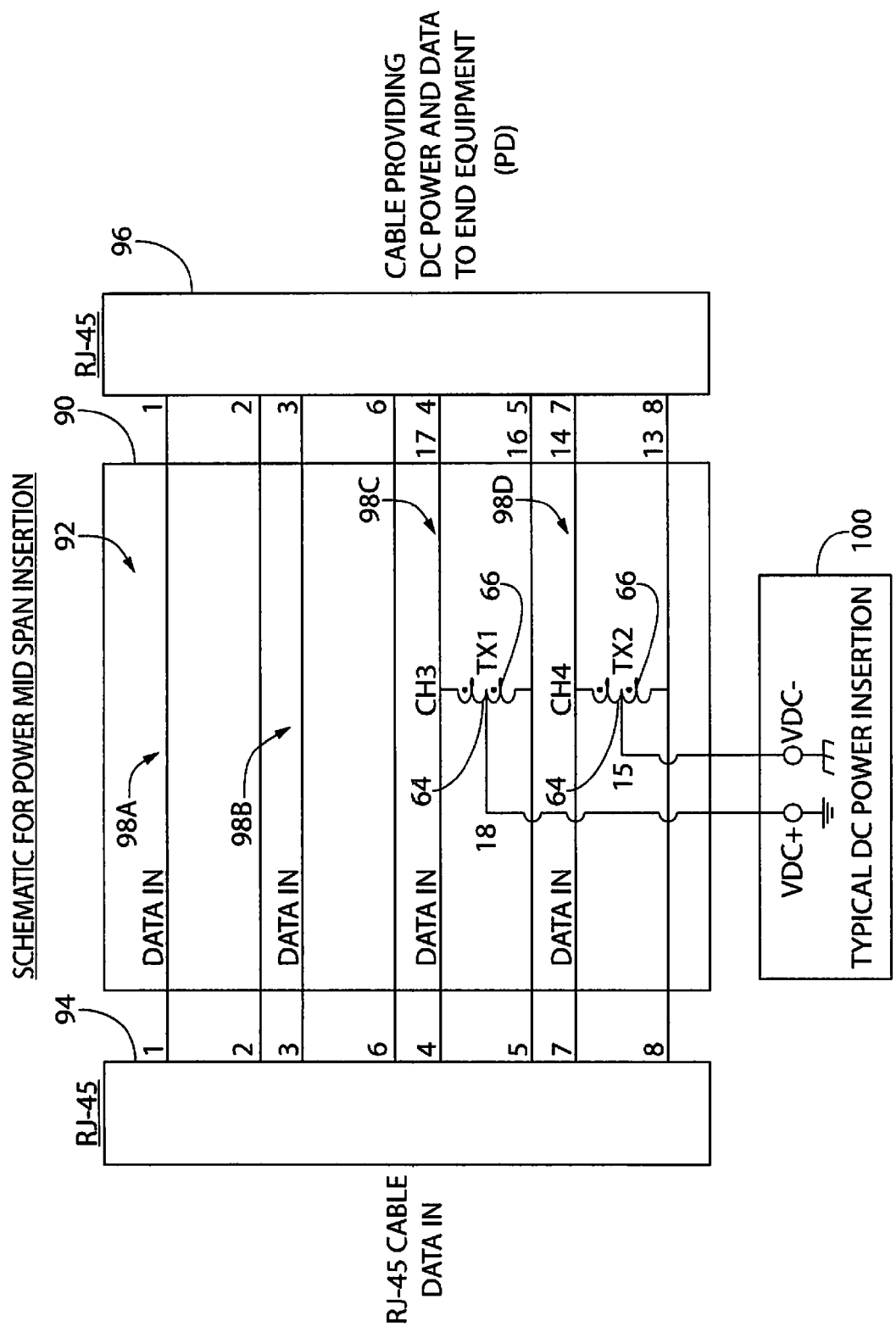
FIG. 20 is a schematic application drawing showing a discrete component incorporating a circuit topology coupled to and providing a data and DC power interface between a data-in-cable and connector and a DC power and data-to-end equipment cable and connector, with mid-span power insertion, according to a fourth embodiment of the invention.

Referring to FIG. 20, a discrete component 90 incorporates a four channel circuit interface 92 according to a fourth embodiment coupled to and providing a data and DC power interface between a data-in cable through an RJ 45 connector 94 on one side and a cable providing DC power and data to end equipment (PD) at the other side through an RJ 45 connector 96. The four channel interface 92 comprises 4 single channel interfaces 98A, 98B, 98C and 98D. Power is inserted onto only two of the single channel interfaces 98C and 98D by connection of a mid-span connection module to center taps 66 of autotransformers 64 identical in construction to those described in connection with the third embodiment. The four channel interface 92 is for 30 Watt applications.

Numerous variations and modifications of the present invention are possible in light of the above teachings. It is therefore understood that within the scope of the claims appended hereto the invention may be practiced otherwise than as specifically disclosed herein.

The invention claimed is:

1. A power over Ethernet (PoE) interface for 10GBase-T Ethernet, the PoE interface comprising:
    an at least one communication channel Ethernet interface adapted to process differential signals from twisted pair cables, each channel including a common mode choke and an autotransformer coupled to the common mode choke;
    the autotransformer including a magnetic core comprising an autotransformer toroid core, an autotransformer magnetic winding on the core, and a center tap for coupling direct current (DC) power;
    the autotransformer magnetic winding comprising about 8 to 14 turns of a pair of wires in the range of between about 35 to 37 gauge twisted together;
    the common mode choke including a magnetic choke core comprising a choke toroid core and a magnetic choke winding, the magnetic winding comprising about 6 to 12 turns of non-twisted pair of wires, portions of said pair of non-twisted wires extending to data and power input pins of the interface in non-twisted form.

2. A PoE interface as recited in claim 1 wherein the wires of the autotransformer winding is 36 gauge and are twisted together about 12 twists per inch.

3. A PoE interface as recited in claim 1 wherein the autotransformer winding comprises about 11 turns and the magnetic winding comprises about 9 turns.

4. A PoE interface as recited in claim 1, wherein the autotransformer magnetic core is formed of MnZn ferrite material and has an outer diameter in the range of between about 2.92 mm to 3.94 mm, an inner diameter in the range of between about 1.51 mm to 2.05 mm and a height of between about 2.16 mm to 2.92 mm.

5. A PoE interface as recited in claim 1 wherein the outer diameter of the autotransformer magnetic core is about 3.43 mm, the inner diameter of the autotransformer magnetic core is about 1.78 mm and the height of the autotransformer magnetic core is about 2.54 mm.

6. A PoE interface as recited in claim 1 wherein the at least one communication channel Ethernet interface comprises four communication channel interfaces.

7. A PoE interface as recited in claim 1 wherein the at least one communication channel Ethernet interface comprises two communication channel interfaces.

8. A PoE interface as recited in claim 1 in combination with a midspan power sourcing equipment (PSE) coupled to the center tap of the autotransformer.

9. A PoE interface as recited in claim 1 in combination with an endpoint PSE coupled to the center tap of the autotransformer.

10. A surface mount package including a housing containing a PoE interface as recited in claim 1 and a plurality of terminal pins affixed to said housing and electrically coupled to said PoE interface.

11. A modular jack including a housing containing a PoE interface as recited in claim 1 and a plurality of contacts and terminals affixed to said housing and electrically coupled to said PoE interface.

12. A power over Ethernet (PoE) interface for 10GBase-T Ethernet, the PoE interface comprising:
    an at least one communication channel Ethernet interface adapted to process differential signals from twisted pair cables, each channel including an autotransformer and not including a common mode choke;
    the autotransformer including a magnetic core comprising a toroid core and a magnetic winding on the core, wherein
    the toroid core is formed of a soft MnZn ferrite material having an outer diameter in the range of between about 5.18 mm to 3.82 mm, an inner diameter in the range of between about 1.73 mm to 2.33 mm and a height of between about 2.32 mm to 3.12 mm.
    the magnetic winding comprising two non-twisted wires, each wire wound around a respective sector of the core about 5 to 11 turns in one direction and then back in the other direction about 1 to 7 turns, the wires in respective sections not touching each other, portions of said non-twisted wires extending to data and power input pins of the interface in non-twisted form.

13. A PoE interface as recited in claim 12 wherein the wires of the magnetic winding are in the range of between about 32 to 36 gauge.

14. A PoE interface as recited in claim 12 wherein each wire of the magnetic winding is wound around a respective sector of the core about 8 turns in one direction and then back in the other direction about 4 turns.

15. A PoE interface as recited in claim 12 wherein the toroid core of the autotransformer has an outer diameter of about 4.5 mm, an inner diameter of about 2.03 mm and a height of about 2.72 mm.

16. A PoE interface as recited in claim 12 wherein the at least one communication channel Ethernet interface comprises four communication channel interfaces.

17. A PoE interface as recited in claim 12 in combination with midspan power sourcing equipment (PSE), coupled to the center tap of the autotransformer.

18. A PoE interface as recited in claim 12 in combination with an endpoint PSE coupled to the center tap of the autotransformer.

19. A surface mount package including a housing containing a PoE interface as recited in claim 12 and a plurality of terminal pins affixed to said housing and electrically coupled to said PoE interface.

20. A modular jack including a housing containing a PoE interface as recited in claim 12 and a plurality of contacts and terminals affixed to said housing and electrically coupled to said PoE interface.

21. A PoE interface as recited in claim 12 wherein the at least one communication channel Ethernet interface comprises two of said communication channel interfaces and two additional data only communication interfaces which do not include autotransformers.

22. A power over Ethernet (PoE) interface for 10GBase-T Ethernet the PoE interface comprising:
    an at least one communication channel Ethernet interface adapted to process differential signals from twisted pair cables, each channel interface including a common mode choke and an autotransformer coupled to the common mode choke;
    the autotransformer including a magnetic core comprising an autotransformer toroid core, an autotransformer magnetic winding on the core, and a center tap for coupling direct current (DC) power;
    the autotransformer magnetic winding comprising about 8 to 14 turns of a pair of wires in the range of between about 35 to 37 gauge twisted together,
    the choke including a magnetic choke core comprising a choke toroid core and a magnetic choke winding, the magnetic winding comprising about 6 to 12 turns of non-twisted pair of wires, portions of said pair of non-twisted wires extending to data and power input pins of the interface in non-twisted form.

23. A PoE interface as recited in claim 22 wherein the wires of the autotransformer winding are 36 gauge and are twisted together about 12 twists per inch.

24. A PoE interface as recited in claim 22 wherein the autotransformer magnetic winding comprises about 11 turns.

25. A PoE interface as recited in claim 22, wherein:
    the autotransformer magnetic core is formed of MnZn ferrite material and has an outer diameter in the range of between about 2.92 mm to 3.94 mm, an inner diameter in the range of between about 1.51 mm to 2.05 mm and a height in the range of between about 2.16 mm to 2.92 mm.

26. A PoE interface as recited in claim 25 wherein the outer diameter of the autotransformer magnetic core is about 3.43 mm, the inner diameter of the autotransformer magnetic core is about 1.78 mm and the height of the autotransformer magnetic core is about 2.54 mm.

27. A PoE interface as recited in claim 22 wherein the at least one communication channel Ethernet interface comprises four of said communication channel interfaces.

28. A PoE interface as recited in claim 22 in combination with a midspan power sourcing equipment (PSE) coupled to the center tap of the autotransformer.

29. A PoE interface as recited in claim 22 in combination with an endpoint PSE coupled to the center tap of the autotransformer.

30. A surface mount package including a housing containing a PoE interface as recited in claim 22 and a plurality of terminal pins affixed to said housing and electrically coupled to said PoE interface.

31. A modular jack including a housing containing a PoE interface as recited in claim 22 and a plurality of contacts and terminals affixed to said housing and electrically coupled to said PoE interface.

\* \* \* \* \*